United States Patent [19]

Bagdasar

[11] 3,758,962
[45] Sept. 18, 1973

[54] ARITHMETIC TEACHING AID KIT

[76] Inventor: Florica Bagdasar, 5901 N. Sheridan Rd., Apt. 13A, Chicago, Ill. 60626

[22] Filed: July 19, 1971

[21] Appl. No.: 163,942

[52] U.S. Cl. ............... 35/31 R, 35/31 G, 35/70
[51] Int. Cl. .................................. G09b 19/02
[58] Field of Search ............ 35/31 R, 31 D, 31 G, 35/31 F, 32, 69, 70, 71, 73; 33/105

[56] References Cited
UNITED STATES PATENTS

| 533,216 | 1/1895 | Troelltsch | 35/31 G |
|---|---|---|---|
| 2,304,893 | 12/1942 | Dickson | 35/31 D |
| 2,804,699 | 9/1957 | Robinson | 35/31 F |
| 2,502,238 | 3/1950 | Wade et al. | 35/31 F |
| 1,244,000 | 10/1917 | Soltoft | 35/31 G |
| 2,635,360 | 4/1953 | Bishop | 35/73 |
| 3,514,873 | 6/1970 | Stobbe | 35/31 F |
| 3,276,151 | 10/1966 | Smith | 35/31 F |
| 2,555,741 | 6/1951 | Greene | 33/105 X |

FOREIGN PATENTS OR APPLICATIONS

| 487,899 | 1929 | Germany | 35/31 R |
|---|---|---|---|
| 3,476 | 1919 | Netherlands | 35/73 |
| 628,048 | 1936 | Germany | 35/31 D |

OTHER PUBLICATIONS 367,223 07001887 Moody 35 31 G

Primary Examiner—William H. Grieb
Attorney—Fred S. Lockwood et al.

[57] ABSTRACT

The invention relates to a teaching aid kit for beginning arithmetic students. A preferred embodiment is disclosed which includes a container with compartments and a number of groups of instructional materials. In the disclosed preferred embodiment, the kit includes a container and at least three main kinds of materials: (a) discrete compact pieces from which the student can assemble and manipulate concrete representations of mathematical sets, (b) printed pieces showing indicia having predetermined sets and which the student uses to identify sub-sets, and (c) a series of printed pieces, each respective piece having a larger set shown thereon than the preceding member of the series, and which the student can use to identify, manipulate, and arrange in increasing or decreasing value. The pieces of the first group have a shape, e.g. a colored circle, which is repeated in the representation of the sets shown on the other printed material in the kit.

1 Claim, 25 Drawing Figures

PATENTED SEP 18 1973 3,758,962

INVENTOR
FLORICA BAGDASAR
BY [signature]
ATT'YS

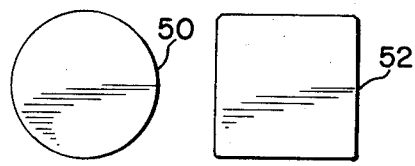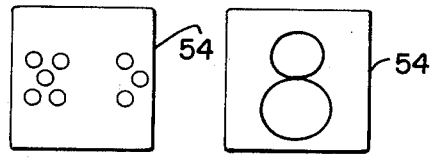
Fig.4.   Fig.5.   Fig.6.   Fig.7.
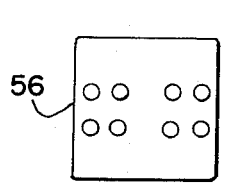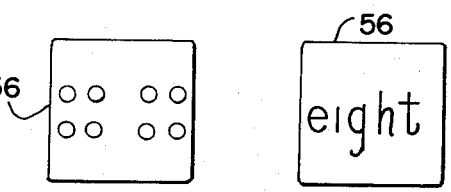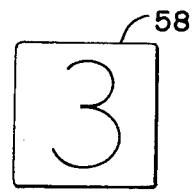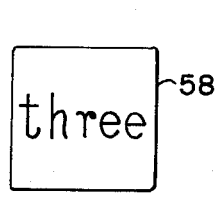
Fig.8.   Fig.9.   Fig.10.   Fig.11.
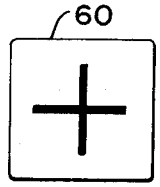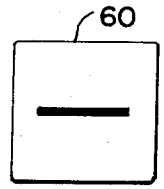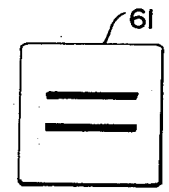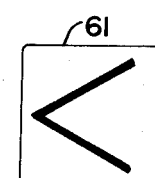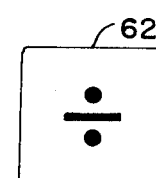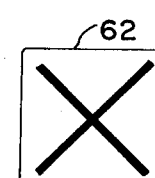
Fig.12.   Fig.13.   Fig.14.   Fig.15.   Fig.16.   Fig.17.
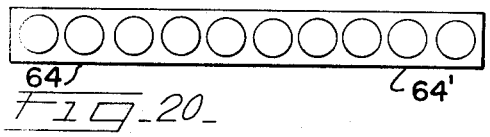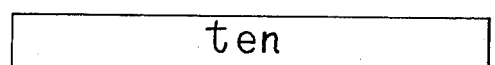
Fig.20.   Fig.21.
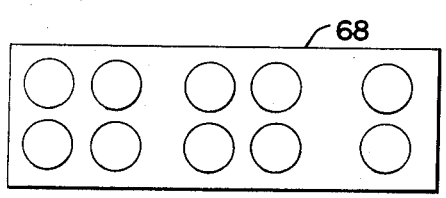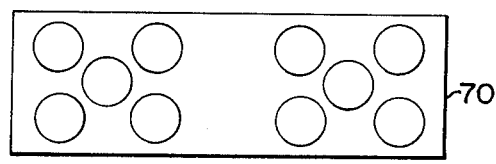
Fig.22.   Fig.23.
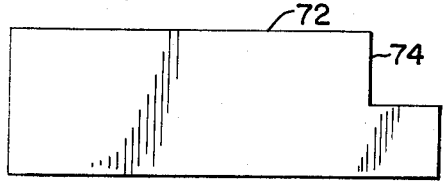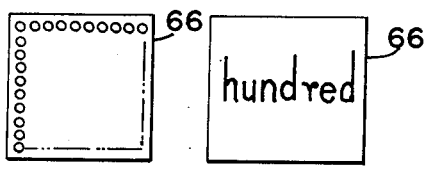
Fig.24.   Fig.18.   Fig.19.
INVENTOR
FLORICA BAGDASAR

ARITHMETIC TEACHING AID KIT

The invention relates to an arithmetic teaching aid kit. The materials provided in the kit help beginning students to understand arithmetic and mathematics by manipulating and showing materials provided in the kit. By use of the kit of this invention students are helped in their understanding of the concept value of the ordinal and cardinal numbers, the value of sets, the basic facts in arithmetic, and the relationship between sets and numbers.

In the pedagogical literature, many educational games have been suggested to present the concept of the numbers in either a fixed or mobile manner. Many of the games require the use of heavy materials, are costly, and difficult to handle, and are apparently designed to be used as demonstration materials or to be used with small groups of children. It is an object of the present invention to provide a teaching aid kit which is useful not only for the instruction of relatively small groups of children, but also for simultaneous use with a whole class of 25 or 30 children, as well.

It is an object of the present invention to provide a teaching aid kit which will enable each one of a relatively large group of children, e.g. 25–30 children, to be able to individualize his work. It is another object of the present invention to provide a mathematics teaching aid kit which enables each child to vary the same exercise in many ways, thus reinforcing his knowledge.

These and other objects which will be apparent hereinafter are achieved in accordance with the present invention which will be described in general hereinafter, and in connection with a particularly preferred embodiment which is described with the aid of the drawings in which:

FIG. 4 is a plan view of one of the discs included with the kit;

FIG. 5 is a plan view of one of the squares included with the kit;

FIG. 6 shows one side of a card with dot sets shown on one side thereof;

FIG. 7 is the representation of the reverse side of one of the cards shown in FIG. 6;

FIG. 8 is one face of a square card having dot sets thereon;

FIG. 9 is the reverse of one of the respective cards such as shown in FIG. 8;

FIG. 10 is one of the series of number cards having the numbers 0–10 written thereon in arabic numerals;

FIG. 11 is the reverse side of the card shown in FIG. 10 having the word numeral written thereon;

FIG. 12 shows one of the cards having a plus symbol on one side thereof;

FIG. 13 is the reverse side of the card shown in FIG. 12 having the minus sign printed thereon;

FIG. 14 is a view of one side of one of the cards having an equal sign printed thereon;

FIG. 15 is a view of the reverse side of the card shown in FIG. 14 showing the greater-less sign printed thereon;

FIG. 16 is a view of one of the cards having a division symbol printed on one side thereof;

FIG. 17 is a view of the opposite side of the card shown in FIG. 16 having the multiplication sign printed on the reverse side thereof;

FIG. 18 shows one face of a card having one hundred dots in 10 rows of 10 dots each;

FIG. 19 shows the reverse side of the card shown in FIG. 18 having the word "hundred" printed thereon;

FIG. 20 shows a card with 10 dots printed thereon;

FIG. 21 shows the reverse side of the card shown in FIG. 20 having the word "ten" printed thereon;

FIG. 22 shows one face of a card having a set of 10 dots arranged in pattern;

FIG. 23 shows the face of another card having 10 dots arranged in a different pattern;

FIG. 24 is a blank card of the same size as the card shown in FIG. 22 and 23 having an opening on one corner thereof;

Figure 1:
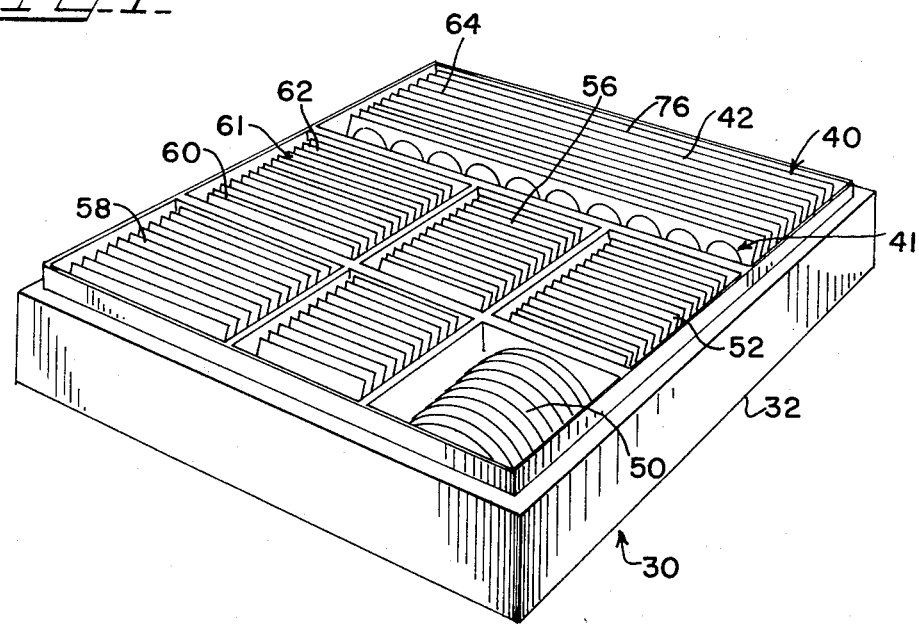
FIG. 1 is a perspective view of a compartmented box containing educational materials in accordance with the present invention.
Figure 2:
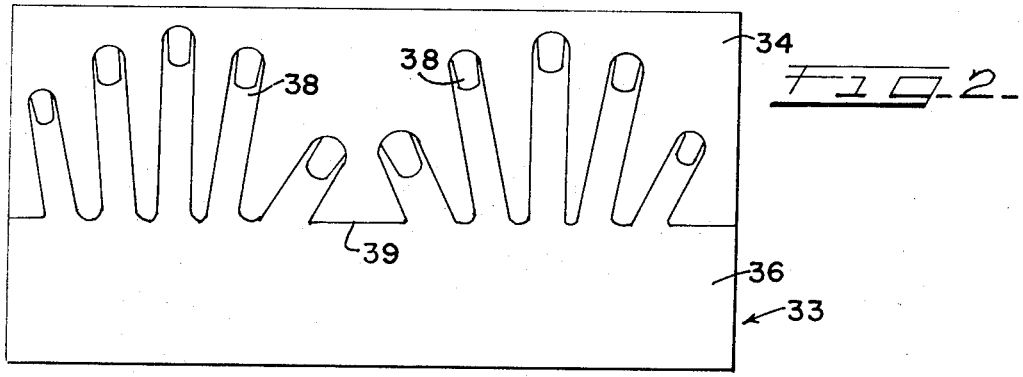
FIG. 2 is a finger counter which is included under the lid of the box shown in FIG. 1.

The kit, generally indicated at 30 includes a relatively shallow box 32, a cover, not shown, and a collection of materials which will be described in greater detail immediately hereinafter. The finger counter generally indicated at 33 and shown in FIG. 2 is prepared from a back sheet 34 and front sheet 36. Front sheet 36 has been cut to form 10 fingers 38. Sheet 34 is preferably relatively stiff material, and sheet 36, including fingers 38, is relatively flexible material, and is colored to contrast with back sheet 34. Fingers 38 are extremely flexible and easily bent along line 40. Thus, when the ten flexible fingers 38 are in the position illustrated in FIG. 2 they are similar to the fingers extending from an open hand, and when they are bent back along line 39 they are similar to closed hands. The other instructional materials generally indicated at 40, are stored in compartments, generally indicated at 41.

Figure 3:
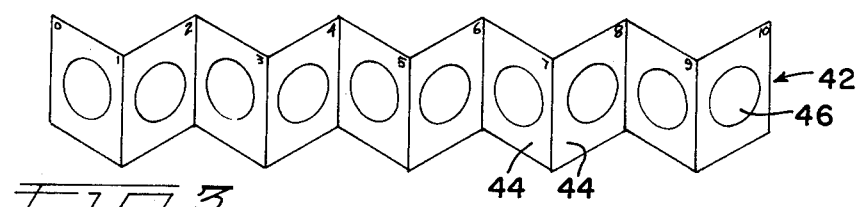
FIG. 3 is a perspective view showing an accordion-pleat number line.

Referring now to FIG. 3, a number line is generally indicated by the numeral 42 and is made from a relatively stiff flexible bendable material. Number line 42 is shown bent into a series of 10 panels 44 in an aligned sequence, each panel bearing the indicia including a respective dot 46 and the numeral corresponding to the position of the respective panel in the series. Hence, the panels are numbered consecutively from left to right, one through ten. The number line 42 is similarly printed on both sides thereof, with the first panel of one side being on the opposite side of the last panel on the reverse side. A view of the opposite side of number line 42 would be substantially identical to that shown in FIG. 3, except that in a preferred embodiment, the dot 46 and respective numeral on the opposite side would be differently colored. In a preferred embodiment, dots 46 on one side are preferably colored red, and the dots 46 on the opposite side are preferably colored blue.

Referring now to FIG. 4 a circular disc 50 is shown. In FIG. 5 a substantially square piece 52 is shown. In the preferred embodiment of this invention, kit 30 includes at least 10 discs 50 which are red on one side and blue on the other side, and 10 squares 52 which are green on one side and yellow on the other side.

Referring now to FIGS. 6 and 7, kit 30 preferably includes at least 11 cards 54 having respective sets of dots printed thereon on one side, cards 54 being selected to provide a series of sets in sequence having from one to 10 dots consecutively in addition to a blank card. With the dots arranged in a pattern of five, where possible, the dots being colored green for the odd numbers and yellow for the even numbers, with the numeral printed on the opposite side of each respective card corresponding to the number of dots in the respective sets.

Referring now to FIGS. 8 and 9, a preferred embodiment of the invention includes at least 11 cards 56 with series of sets of dots printed thereon, and assembled to include sets having from one to 10 dots, consecutively, and a blank card 56 corresponding to the empty set. On cards 56 the dots are arranged in patterns of four, where possible, and the dots are printed in red for the odd numbers and in blue for the even numbers. On the opposite side of cards 56 having the word numeral written on the other side in blue.

Referring now to FIGS. 10 and 11, a preferred embodiment of the invention preferably includes at least 11 cards 58, each card 58 having a respective word number from 0–10 on one side, and the corresponding numeral written in black on the reverse side thereof.

Referring now to the cards 60, 61 and 62 shown in FIGS. 12 through 17, it is preferred that two of each of these cards be included in the preferred embodiment of this invention.

Referring to FIGS. 20 and 21, it is preferred that kit 30 include at least one card 64 having 10 green dots aligned on one side, and the word "ten" printed on the other side. It is preferred, also, that the set include at least 10 cards 64' having ten red dots aligned on one side, and 10 blue dots aligned on the other side. Both faces of cards 64' are identical to the face of card 64 shown in FIG. 20 except that the coloring is different. Referring now to FIGS. 18 and 19, it is preferred that the kit have at least four cards 66 having 100 dots printed on one side and the word "hundred" printed on the reverse side thereof.

Referring now to FIG. 22, it is preferred that the kit 30 include at least one card 68 having 10 red dots arranged thereon in patterns of four, as much as possible. Referring now to FIG. 23, it is preferred that kit 30 also include at least one card 70 having 10 green dots arranged in patterns of five printed thereon.

Referring now to FIG. 24, a card 72 having a large notch 74 which is slightly greater than the area occupied by one of the dots in FIG. 22. It is preferred that cards 68, 70 and 72 have the same length and width dimensions.

Figure 25:
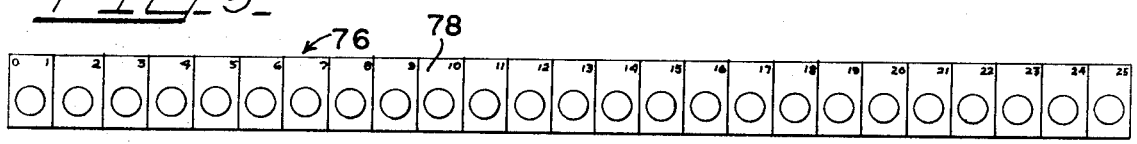
FIG. 25 is a number line having a series of 25 units in a line with a dot printed in each unit, with a numeral corresponding to the units position in the series.

Referring now to FIG. 25 elongated card 76 is separated into 25 panels 78, each panel having a dot and a numeral corresponding to the position of the dots in the series from one to 25. It is preferred that the first 10 dots have one color, for example red, the dots numbered 11–20 have another color, for example blue, and that the remaining dots be colored green.

Although I have found that circular discs are the most preferred shape for pieces 50, which are provided for assembling concrete representations of sets, it is to be understood that other shapes such as the square shape of card 52 may also be used, and in fact, cards 50, 52 can be in any shape deemed desirable including triangles, diamonds, octagons, and the like. However, it is an important aspect of this invention, that the indicia used on the cards 54, 56, 64, 64', 66, 68 and 70 have printed thereon sets of representations the same shape as that used for the pieces 50 which the student uses to assemble concrete representations of sets. I have found that this greatly enhances the student's ability to correlate exercises and greatly enhances the reinforcing of their knowledge.

As indicated above, kit 30 includes three main groups of materials; namely, group (a) which relates to compact pieces which the student can use to assemble concrete representation of sets, and these materials would include pieces 50, 52, cards 64, 64', 66; group (b) which includes groups of individual pieces which individually have a member of a series of sets printed thereon, and these include cards 54, 56; and group (c) which includes materials having larger sets printed thereon in a manner which enables the student to conveniently identify sub-sets, and these materials include the finger board 33, number lines 42, 76, cards 68, 70. In addition to these three major groups of materials, the additional preferred supplemental materials include cards 58 which have the individual numbers and corresponding word numbers on opposite sides thereof, and the symbol cards 60, 61 and 62.

In using finger board 33, the student can readily display sets of fingers against back card 34 by bending unwanted numbers. This can be used to provide exercise in adding and subtracting, as well. Number line 42 can be used, for example, by asking the student to count off a set of four, for example, and by holding the appropriate panel 44 corresponding to the requested number in his fingers, the student can look at the reverse side of the number line piece 42 and see on the reverse side thereof the number on the next panel to determine the number which must be added to the requested number, e.g. four, to total 10.

As indicated above, cards 54, and 56 can be used by the student to arrange the sets in sequence. As a reinforcement of this exercise, the student can then arrange below the respective cards, the number cards 58 which correspond to the number of dots in the set on card 54. Cards 56 can be used in a similar manner. Indicia bearing cards 64, 68 and 70 can be used in exercises in which the teacher asks a student to "show me" a set of three, or a set of four, or any other desired number, and the student can place card 72 over the respective indicia-bearing card to expose only the desired number of dots.

It is contemplated that each student will have a kit 30 and that a teacher will have a substantially identical kit except that, for demonstration purposes, the teacher's kit is preferably considerably larger in size than the student's kit. Nonetheless the student's kit can be relatively small. For example a student's kit 30 is approximately 5½ inches long, 3½ inches wide and 1½ inches high.

Using the sign cards 60, 61, 62 and the number cards 54, 56, 58 in conjunction with the compact shaped objects 50, 52 the student can make basic mathematical statements, for example, "2 × 3 = 6", and in addition assemble a concrete representation of the statement by placing, for example, three sets of two articles 50 or 52 above the statement. Such statements and assemblies conveniently fit on a relatively small desk.

A student can use cards 64, 64' and 66 in assembling concrete representations of sets or numbers, and for example a comparison of the set assembled for the number 14 is dramatically different from the set assembled for the number 41. Also, for example, those materials having complete sets shown thereon, e.g. items 42, 64, 64', 68, 70, and 76 can be used in a cooperative exercise in which the teacher asks the student to "show me" any particular number set, and after doing so ask the student to "show me" how many are left after taking away some certain number of dots. Similarly these materials can be used for addition exercises.

Thus, by providing, in a single kit, the various groups of materials, each having sets of similar shapes, the student readily correlates what he has learned in one exercise with what he learned in other exercises. Moreover, by providing dots with different colors as described above the student can assemble concrete representations of sets and sub-sets by using different colors for the different sub-sets. For example, using pieces 50, with the red side up for one sub-set, and with the other pieces 50 with the blue side up, the student will perceive the red and blue pieces as respective sub-sets and these assemblies can be used to provide addition and subtraction exercises, as well as multiplication or division exercises.

In another highly desirable use of the kit of the present invention, the teacher and the student can engage in cooperative exercises in which the student is asked to "find it, show it and say it". For example, to start this exercise, a student may be asked to find a card depicting a set of six dots, or a card depicting the number eight, or any other desired information, or statement. The resulting processes are highly beneficial for the student. For example, finding the correct answer involves an active mental operation on the part of the student, showing of the answer by raising the card, for example, to show the teacher, provides a concrete way in which to verify the answer, and saying the answer actively reinforces the knowledge, even providing to some extent auto-verification of the answer. The teacher can, at a glance, check the cards of an entire class when they are held up, and thus in a few moments verify the answers of all the children in the class, and in addition, simultaneously assure herself of the active involvement of each student in the exercises.

I claim:

1. An educational teaching aid kit for teaching arithmetic to beginning students comprising a container with a number of compartments therein, the respective compartments having respective groups of educational teaching materials therein, the educational teaching materials including a first group comprising compact pieces having a predetermined shape and being adapted for assembly by the student into concrete representations of sets, said educational materials also including a second group comprising series cards in which each respective card depicts a set of shapes, each shape being substantially identical to the shape of said compact pieces, said cards having the number corresponding to the respective number of depicted shapes depicted on the reverse side thereof, and a third group of educational material having predetermined large sets of said shapes depicted thereon arranged in a manner which enables the students to conveniently identify sub-sets, and in which the shapes are arranged along a pair of elongated parallel lines, and in which said kit includes means for covering all or parts of said shapes on the respective materials in said third group, said means comprising an elongated cover having one axial end thereof extending in a straight line across the width of said cover, and the other end thereof being notched to expose one more shape in one line than the number of shapes exposed at the unnotched portion of that edge, whereby an odd number of said shapes can be left exposed by said notched edge.

* * * * *